(No Model.) 2 Sheets—Sheet 1.
J. W. CAMPBELL.
SEEDER AND PLANTER.
No. 519,986. Patented May 15, 1894.
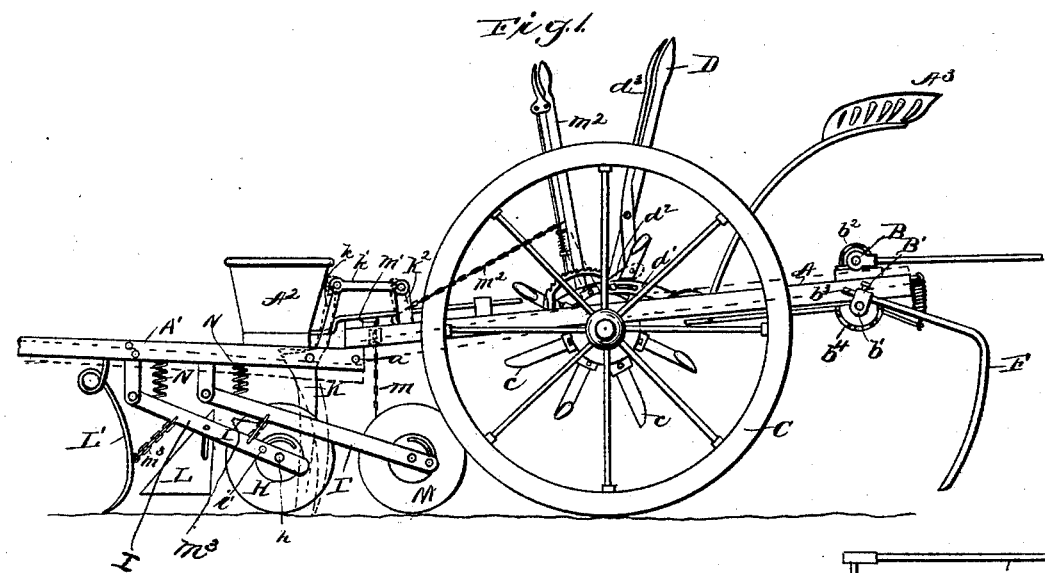
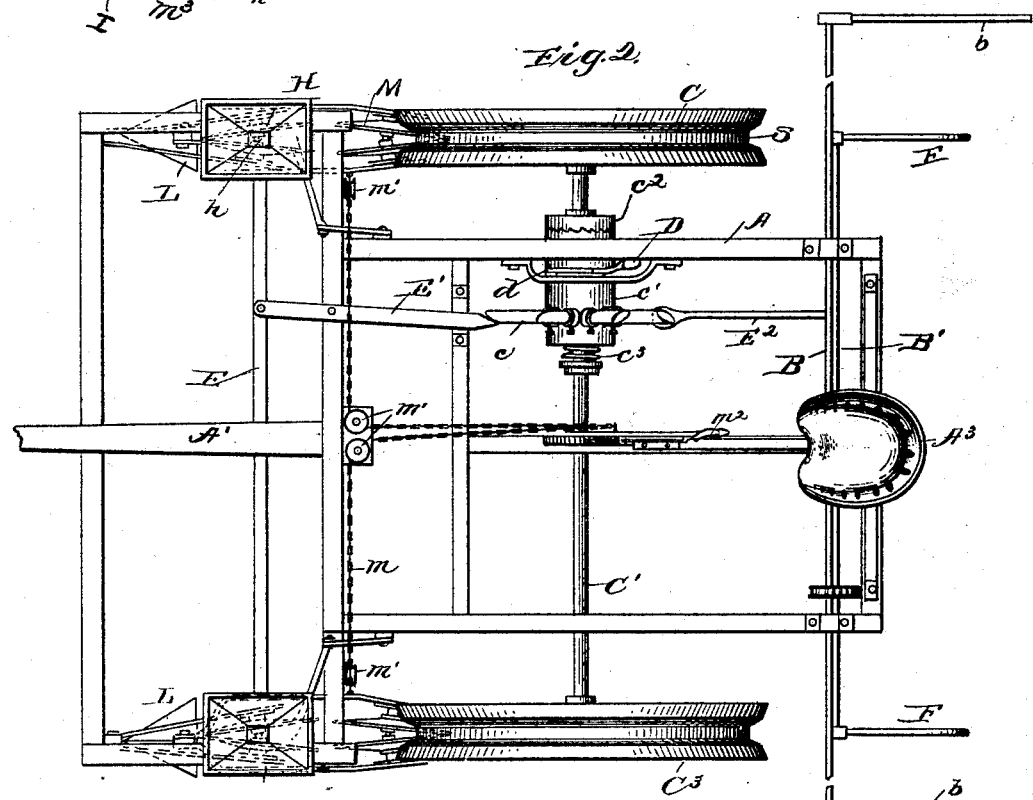
Witnesses
J. M. Fowler Jr.
Aly Stewart
Inventor
James W. Campbell
By Church & Church
his Attorneys
THE NATIONAL LITHOGRAPHING COMPANY,
WASHINGTON, D. C.

(No Model.) 2 Sheets—Sheet 2.
J. W. CAMPBELL.
SEEDER AND PLANTER.
No. 519,986. Patented May 15, 1894.
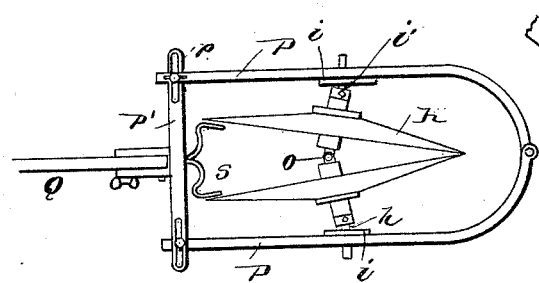
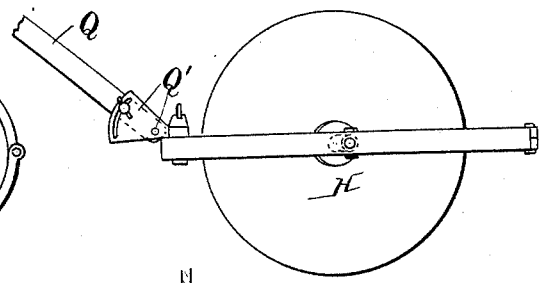
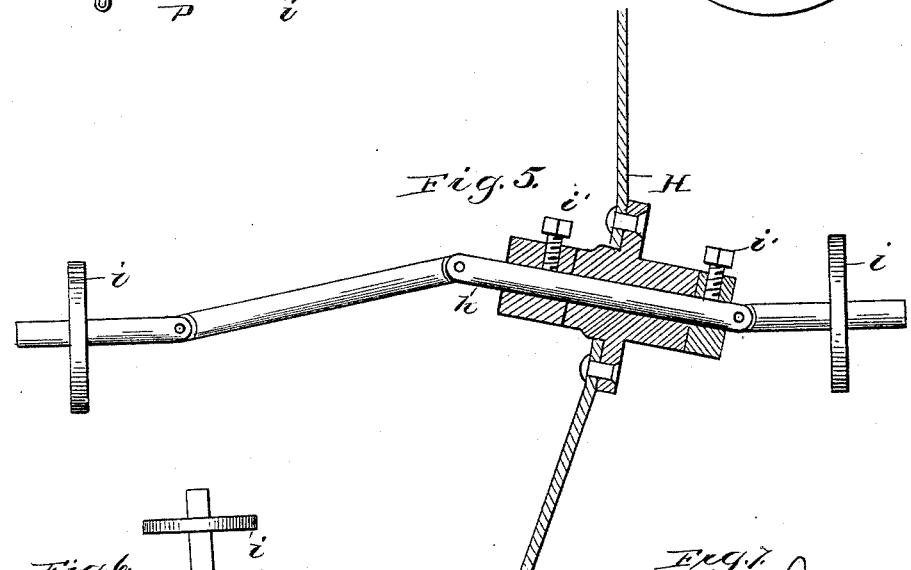
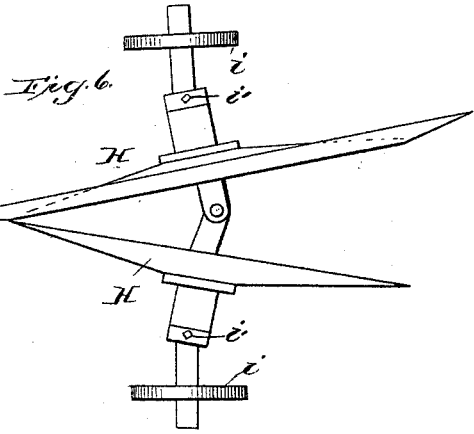
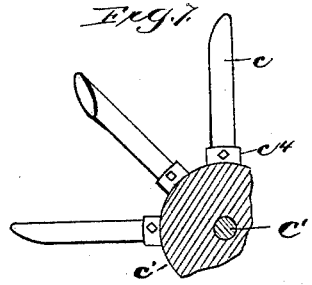
Witnesses
J. M. Fowler Jr.
Aby J. Stewart
Inventor
James W. Campbell,
By Church & Church,
his Attorneys

UNITED STATES PATENT OFFICE.

JAMES W. CAMPBELL, OF URSA, ILLINOIS.

SEEDER AND PLANTER.

SPECIFICATION forming part of Letters Patent No. 519,986, dated May 15, 1894.

Application filed August 24, 1893. Serial No. 483,962. (No model.)

*To all whom it may concern:*

Be it known that I, JAMES W. CAMPBELL, of Ursa, in the county of Adams and State of Illinois, have invented certain new and useful Improvements in Seeders and Planters; and I do hereby declare the following to be a full, clear, and exact description of the same, reference being had to the accompanying drawings, forming a part of this specification, and to the letters of reference marked thereon.

This invention relates to improvements in seeders and planters, but is especially, though not exclusively applicable to corn planters, the objects of the invention being to provide a simple machine of light draft which will effectually open the soil for the reception of the seed and cover the latter perfectly to the proper depth, and further a machine which may be operated without the employment of a check rope or wire, to drop the seed in perfect check, and at the same time, mark and indicate in such manner that the operator may readily determine if the machine is operating correctly.

In the accompanying drawings: Figure 1 is a side elevation of a planter embodying my present invention. Fig. 2 is a top plan view of the same. Fig. 3 is a detail of a pair of disks mounted in the preferred manner. Fig. 4 is a side elevation of the same. Fig. 5 is an enlarged detail section showing the axle for the disk. Fig. 6 is a plan of the preferred form of disks not shown in the other figures to prevent obscurity, and Fig. 7 is a detail section of the hub carrying the cam arm.

Similar letters of reference in the several figures indicate the same parts.

Referring particularly, now, to Figs. 1 and 2, it will be seen, that a main frame A of the usual construction is provided, having a forward runner or tongue frame A' hinged thereto at $a$ and adapted to carry the seed boxes $A^2$ in the usual manner. The driver's seat $A^3$ is mounted on the main frame, preferably in line with shafts B B' for operating the marker and indicator, for a purpose which will presently appear.

Ground wheels C C mounted on axles C' support the main frame, and one or both of these wheels are adapted to operate the checking, marking and indicating mechanism through the medium of a series of movable, or removable cam arms $c$, carried by a hub $c'$ mounted on the axle C' and adapted to be connected so as to rotate therewith by means of a clutch disk $c^2$ with which it is held in engagement by means of a spring $c^3$. The hub $c'$ is capable of a limited longitudinal movement on the axle so as to free itself from the clutch disk $c^2$, and in order to so move the said hub, I provide an operating handle D pivoted to the main frame through the medium of a slotted yoke $d'$ and having a forked end co-operating with a groove $d$ in the hub. The operating handle D is provided with a pawl $d^2$ controlled by a handle $d^3$ for co-operating with the hub, thus the hub may be moved longitudinally out of engagement with the clutch disk and then turned forwardly by means of the pawl to set the checking mechanism so as to register exactly with the rows previously planted, thus the effect of turning the machine at the ends of the rows may be instantly compensated for.

The cam arms before referred to, are removably held in place by having their inner ends clamped in sockets $c^4$ on the hub $c'$, thus any one or more of them may be removed to plant at different distances apart, or a sufficient number may be introduced to cause the machine to operate in effect as a drill.

To operate the seed slide E from the cam arms, I provide a pivoted lever E' which is moved first in one direction and then in the other by being struck by the oppositely arranged cam surfaces on the arms, and the same arms operate the marking mechanism by striking an arm or lever $E^2$ extending forwardly from the shaft B'. The oscillation thus communicated to the shaft causes the marking arm or dig F to descend and make a distinct mark or dig in the earth directly in rear of the ground wheel, and the position of this marker with relation to the seed tube and operating mechanism, is such, that the mark is made midway between the hills planted, so that there is no danger of the corn being uncovered by the marking operation. The shaft B which is movable transversely of the machine, carries at the end an arm $b$ which is adapted to be turned down at the same moment that the mark is made, but directly over the mark made in the previous row, hence the operator can by a glance determine if the machine is in exactly proper position with relation to the hills previously planted. The movement of the shaft B' is communicated to the shaft B by means of the sprocket wheels $b'$ $b^3$ and chain $b^4$.

In planters and seeders constructed in accordance with this invention instead of employing the usual shoe or runner for opening the soil, I now propose to use a pair of disks mounted on centers forming an angle with each other so as to bring the front edge of the disks together to form a single cutting edge which will enter and force the earth open as the disks progress forward to form a channel for the reception of the seed. As shown, I also employ a pair of oppositely arranged disks in rear of each pair of opening or furrowing disks for closing the furrow, as will be presently understood.

Referring now, particularly to Figs. 1 and 2, it will be seen that a pair of disks H mounted on an axle $h$ bent rearwardly at the center and carried by a vertical spring frame I are provided, and the whole hung to the forward portion of the tongue or runner frame A' in position for the seed tube K to enter between the rear or open ends of the disks H. These disks preferably contact at the edge, and the point of contact with relation to the machine may be varied easily and quickly by turning the axle and clamping it in place by means of the hub flanges $i$ which are rigidly connected with the frame by set bolts $i'$. With this arrangement, it will be seen, that the point of contact may be shifted up or down, depending upon the height of the planter or the depth at which the disks are intended to enter into the soil, and by mounting them on a vertical spring frame they are allowed to accommodate themselves to any irregularities in the surface of the ground over which the machine travels.

In front of the opening disks H, I preferably mount a vertically adjustable guard L, the function of which is to move to one side any stones, sticks or lumps of earth which might become wedged between the disks if allowed to travel back against the same above the point of contact, and in front of this guard L, I arrange a spring weed catcher L' which will drag over the earth directly in front of the disks, and remove any weeds, grass, &c., which might tend to prevent the disks from entering and opening the soil properly.

In rear of the disks H and between the seed tube and ground wheels I mount a second pair of disks M, which I shall herein term covering disks. They are hung on the frame I' similar to the frame I, the only difference being that they are reversely arranged, that is to say, open at the forward side and closed or brought close together at the rear side so as to turn the soil in toward the center and effectually cover the seed deposited in the furrow formed by the forward disks.

The disks and all of the loose depending parts on the forward frame A', may be elevated by means of the chains $m$ passing up over the pulleys $m'$ $m'$ and back to an operating handle $m^2$. The lower end of this chain $m$ is connected to the frame I' and chains $m^3$ $m^3$ connect the two frames I I' and weed catcher L together, so that they may be raised simultaneously.

Springs N serve to hold the frames I I' down with an elastic pressure, and in a large measure support the forward frame A', thus each individual pair of disks may rise and fall with the inequalities of the ground, and there is an elasticity to the whole supporting structure which will materially lighten the draft of the machine, this effect being also especially noticeable because of the fact that all the contacts with the earth are rolling contacts, there being no shoe or other portion to drag and increase the draft.

The elasticity referred to, causes a movement between the two frames A and A', and in fact this movement is incident to all planters, of this class and to it is due one of the main difficulties in planting the seed in absolute check for, if the seed be discharged from the tube when the two frames are at a sharp angle to each other, as when the machine is in a hollow the seed will be dropped forward of the mark and if the opposite condition exists, the seed will be dropped in rear of the mark, thus it has been found impossible to drop with the greatest accuracy, and in order to overcome this defect, the seed tube K in my machine is pivotally connected to the frame A' with its upper end in position to receive the seed discharged from the seed box or hopper, and to an upward extension $k$ of the seed tube, a link $k'$ is pivoted and connected at the rear end, to the rigid portion $k^2$ of the rear frame A. With this arrangement, it will be seen at once, that if the hinge $a$ be depressed, throwing the ground wheels, marker and furrowing disks farther apart, the lower end of the seed tube will be thrown backward as shown in dotted lines, Fig. 1 and its relative position preserved so that the corn or other seed may be dropped in exact check with that previously planted. If the opposite condition exists, that is to say, if the frame A be raised, throwing the ground wheels, marker and disks closer together, the seed tube will be thrown forward and the accuracy of the check preserved under these conditions, thus making it almost impossible to disturb the relative position of the lower or discharge end of the seed tube because of the unevenness or roughness of the soil over which the planter travels.

In the preferred construction, the furrowing disks before referred to are arranged on a jointed axle which latter is mounted in an expansible frame, as shown in Figs. 3 and 5, wherein the two halves of the axle $h$ are hinged together at $o$ and are connected to the adjustable sides P of the expansible frame by means of the disks $i$, thus the disks may be set apart, by adjustment on the axle itself or the angle of the disks with relation to each other may be changed so as to open or close a wide furrow or a narrow furrow, as the case may be, adapting the device for use upon various kinds of seeders and planters and for planting grain of all kinds.

As shown in Fig. 3, the sides of the expansible frame P are held in position by cross piece P' united thereto by bolts $p$ having the drag bar or frame Q adjustably connected thereto by means of a pivot and segment connection Q' in order that the frame P may be maintained in horizontal position irrespective of the height of the machine to which it is applied.

In Fig. 6, I have shown one of the disks H provided with a straight forwardly extending cutting flange R' and in this construction, the co-operating disk is adapted to run in close or make contact with the disk having the cutting flange at the base of said flange, whereby the flange itself constitutes in effect a colter having a very sharp edge, which will materially facilitate the opening of the soil by the disks.

By locating the driver's seat immediately over the marker and indicators, it is obvious that the driver can sight along the rear of the marks at the moment when the indicator is turned down and will thus be enabled, without leaving his seat and without taking his attention away from his other duties, to determine whether the machine is operating in perfect check, and by causing the marker to operate midway between the hills, the hills are left undisturbed after having been planted.

With a view to shortening up the machine as much as possible, it may be found desirable to cut away the center portion of the peripheries, or recess the peripheries of the ground wheels, as at S, so as to allow the rear edges of the rear disk to enter the same, especially when raised, as shown clearly in Figs. 1 and 2, but it is obvious that this is quite immaterial so far as the successful operation of the essential elements is concerned, and hence I do not wish to be limited to this or any other particular form or style of corn planter construction, other than as specified in the claims.

Obviously, the furrow opening and closing disks may be employed on all kinds of planters and seeders and I do not wish to be understood as limiting my invention in this particular.

Having thus described my invention, what I claim as new is—

1. In a corn planter, the combination with the front and rear frames and carrying wheels, of the pivoted seed tube carried by the forward frame, and the link connecting said seed tube and rear frame, whereby the discharge end of the tube is maintained in proper relative position, irrespective of the movement of the two frames with relation to each other, substantially as described.

2. In a corn planter, the combination with the main frame, with carrying wheels thereon, and the forward tongue or runner frame, hinged to the main frame, of the seed tube pivotally mounted on the runner or tongue frame, a projection rigidly connected with the main frame and a link connecting the seed tube and said projection; substantially as described.

3. In a corn planter, the combination with the main frame, the carrying wheels therefor and the runner or tongue frame hinged to the main frame, of the seed tube pivotally mounted on the tongue or runner frame, the upwardly extending projection on the seed tube, the projection on the main frame and the link connecting said projection on the main frame and seed tube respectively, whereby the relative position of the seed tube is maintained, substantially as described.

4. In a planter, or seeder, the combination with the seed feeding mechanism, of the furrow opening disks, the angular adjustable axle on which said disks are journaled with their edges at one side in proximity to each other; substantially as described.

5. In a seeder or planter, the combination with the frame, seed tube and seed feeding mechanism, of the furrow opening disks, mounted on centers at an angle to each other whereby their edges at one side are brought into proximity the angle axle forming the center upon which said disks revolve and the hub flanges adjustably connecting said axle and frame for adjusting the axle on its longitudinal center, whereby the point of contact of the disk may be changed; substantially as described.

6. In a seeder or planter, the combination with the frame, the seed tube and seed feeding mechanism, of the furrow disks, the expansible frame and the extensible axle rigidly connected therewith and having the centers for the disks at an angle to each other; substantially as described.

7. In a seeder or planter, the combination with the furrow disks arranged at an angle to each other, the extensible axle on which said disks are adjustably mounted, the frame having the laterally adjustable side pieces, with which the axle is united and the draft bar connected with said frame; substantially as described.

8. In a seeder, or planter, the combination with the feed distributing mechanism, of the concave furrow disk having the straight flange at the outer edge, of the cooperating disk having its edge in proximity to the first mentioned disk at the inner side of the flange, whereby a single sharp cutting edge is presented; substantially as described.

JAMES W. CAMPBELL.

Witnesses:
THOMAS DURANT,
A. M. KELLY.